United States Patent [19]
Chang

[11] Patent Number: 6,112,645
[45] Date of Patent: Sep. 5, 2000

[54] AUTOMATIC COOKING MACHINE

[76] Inventor: Shien-Fang Chang, 5th Fl., No. 30, Lane 234, Sec. 1, Charng-Rong Rd., Tainan, Taiwan

[21] Appl. No.: 09/505,976

[22] Filed: Feb. 16, 2000

[51] Int. Cl.[7] .............................. A23L 1/00; A47J 27/00; A47J 37/00

[52] U.S. Cl. .............................. 99/327; 99/332; 99/335; 99/348; 99/352; 99/355; 99/357

[58] Field of Search ...................... 99/325–334, 352–355, 99/357, 342, 348, 443 C, 443 R, 486; 426/231–233, 523; 219/400, 413, 490, 491, 494

[56] References Cited

U.S. PATENT DOCUMENTS

| | | | |
|---|---|---|---|
| 3,827,345 | 8/1974 | Willson | 99/325 |
| 3,884,135 | 5/1975 | Lohr, et al. | 99/348 |
| 3,945,309 | 3/1976 | Moran | 99/348 X |
| 3,986,443 | 10/1976 | Shimizu | 99/334 |
| 4,173,925 | 11/1979 | Leon | 99/348 |
| 4,195,558 | 4/1980 | Speakman | 99/325 |
| 4,289,064 | 9/1981 | Rosenblatt | 99/334 |
| 4,301,717 | 11/1981 | Knees | 99/348 |
| 4,304,177 | 12/1981 | Koether | 99/348 X |
| 4,331,068 | 5/1982 | Asami | 99/325 X |
| 4,437,159 | 3/1984 | Waugh | 99/327 X |
| 4,503,502 | 3/1985 | Chapin | 99/348 X |
| 4,700,617 | 10/1987 | Lee et al. | 99/327 |

*Primary Examiner*—Timothy Simone
*Attorney, Agent, or Firm*—Alan D. Kamrath, Esq.; Oppenheimer Wolff & Donnelly LLP

[57] ABSTRACT

An automatic cooking machine includes a feeding device, a deep-fry device, stove device, a cooker transmission device, a serving device, a washing device, a stir-fry device and a panel each mounted on a base. A program logic controller corresponding with micro-switches and photoelectric sensors controls each of the devices to carry out an automatic cooking process. With such an automatic cooking machine design, the automatic cooking machine can stir-fry and deep-fry like a human cook and is easy to keep in good repair.

14 Claims, 17 Drawing Sheets

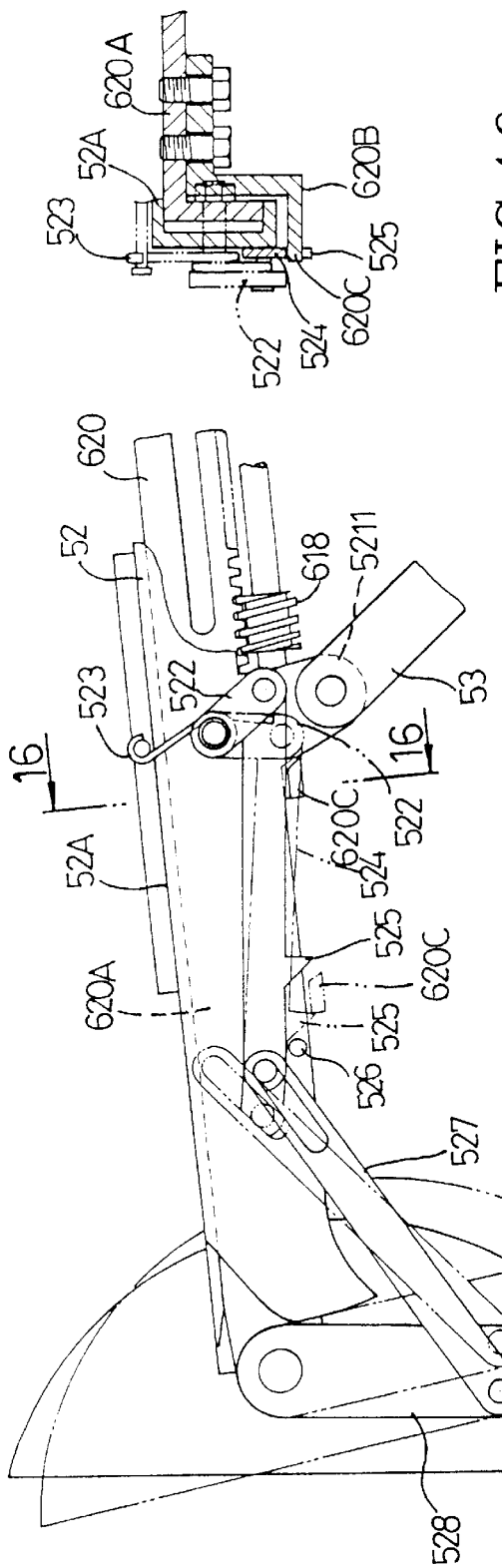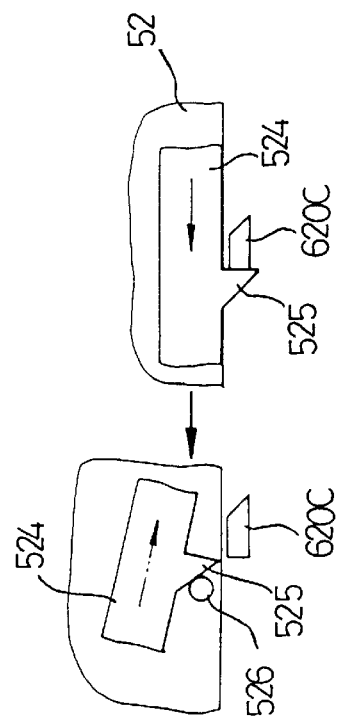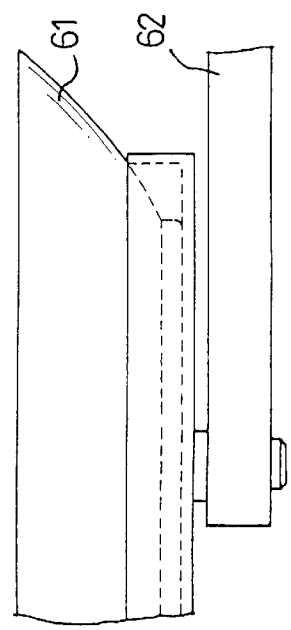
FIG.14
FIG.15
FIG.16

6,112,645

AUTOMATIC COOKING MACHINE

BACKGROUND OF THE INVENTION

1. Field of the Invention

The present invention relates to a cooking machine, and more particularly to an automatic cooking machine that has a PLC (program logic controller) to control the processes of the automatic cooking machine.

2. Description of Related Art

The closest prior art of which the applicant is aware is disclosed in U.S. Pat. No. 4,700,617 to Yu-Chuan Lee, filed on Oct. 20, 1987, entitled "Automatic Frying Machine".

Many different cooking machines have been developed to prepare stir-fried Chinese food. One such cooking machine is the "Automatic Frying Machine" which is disclosed in U.S. Pat. No. 4,700,617 to Yu-Chuan Lee. The "Automatic Frying Machine" comprises a feeder device to automatically place materials into a cooker, a frying and stirring device and a mechanism to turn the cooker through 180° for the purpose of serving the prepared food. The machine washes the cooker with a stirrer and water ejectors. The device can be operated in one process that includes material feeding, frying and serving and cooker washing.

Even through the cooking machine can feed, fry and serve the material and wash the cooker in a single process, it has several disadvantages as follow.

1. The automatic frying machine in accordance with the prior art only has a stir-fry cooker. As is well known, many Chinese foods such as carp with hot bean sauce, sweet and sour spareribs and chicken with dry red pepper need to be deep-fried first and then stir-fried. Consequently, the conventional machine must run two cycles to complete the cooking process. It is not convenient for user.

2. The stirrer is rotated in the stir-cooker during cooking. The action of the stirrer is different from that of a human cook. The lower materials in the conventional cooker are always in the bottom of the stir-fry cooker and cannot be evenly stirred.

The present invention has arisen to mitigate and/or obviate the disadvantages of the conventional automatic frying machine.

SUMMARY OF THE INVENTION

In accordance with one aspect of the present invention, an automatic cooking machine includes a feeding device, a deep-fry device, a stove device, a cooker transmission device, a serving device, a washing device, a stir-fry device and a panel mounted on a base. A program logic controller with corresponding micro-switches and photoelectric sensors controls each of the devices to complete the automatic cooking process. With such a design, the automatic cooking machine can stir-fry and deep-fry like a human cook and is easy to keep in good repair.

Further benefits and advantages of the present invention will become apparent after a careful reading of the detailed description with appropriate reference to the accompanying drawings.

BRIEF DESCRIPTION OF THE DRAWINGS

FIG. 14 is an operational front plan view of the serving device in FIG. 13;

FIG. 15 is a partial operational front view of the serving device in FIG. 14;

FIG. 16 is a partial cross sectional side plan view of the serving device in FIG. 14;

DETAILED DESCRIPTION OF THE INVENTION

Figure 1:
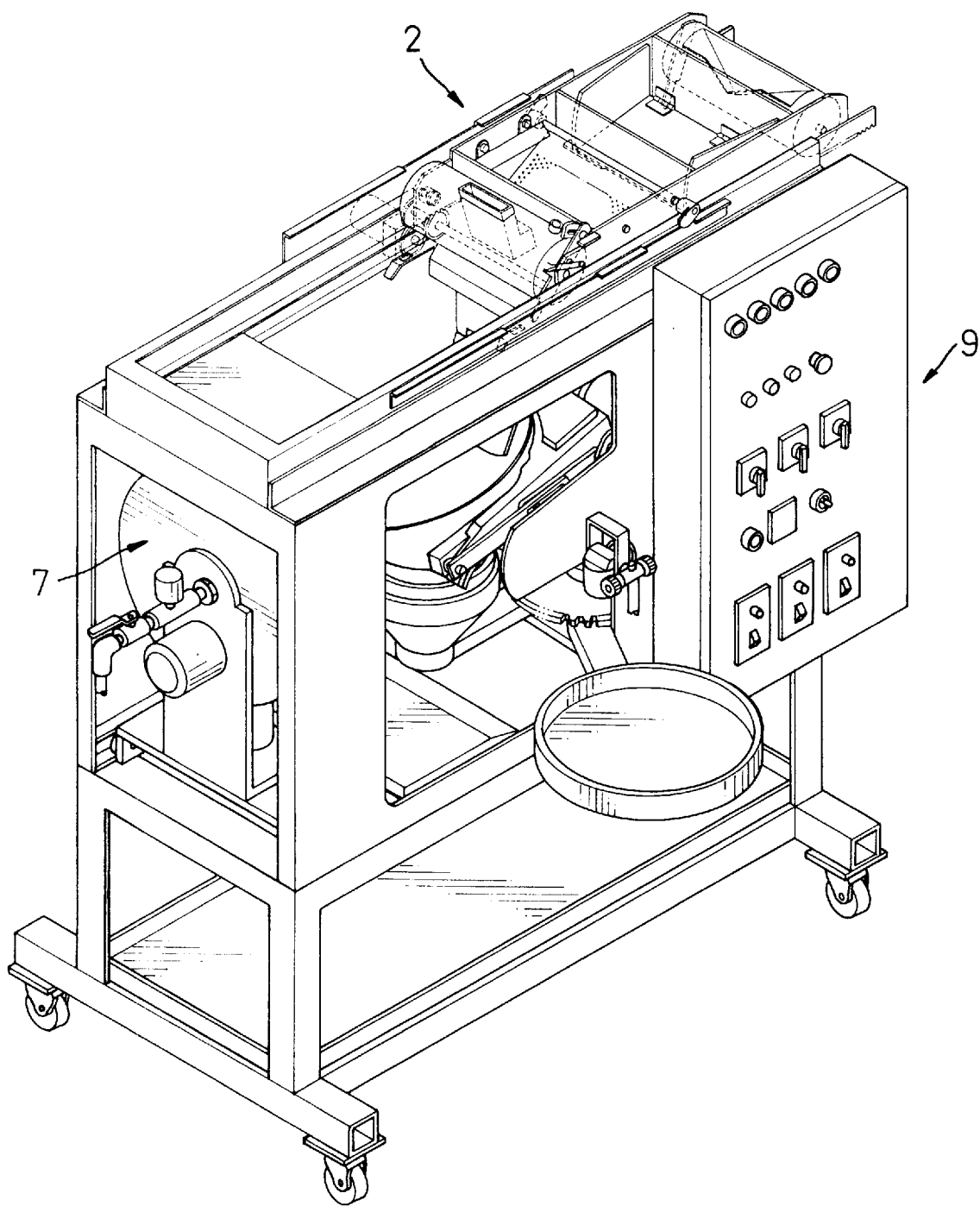
FIG. 1 is a perspective view of the automatic cooking machine in accordance with the present invention.
Figure 2:
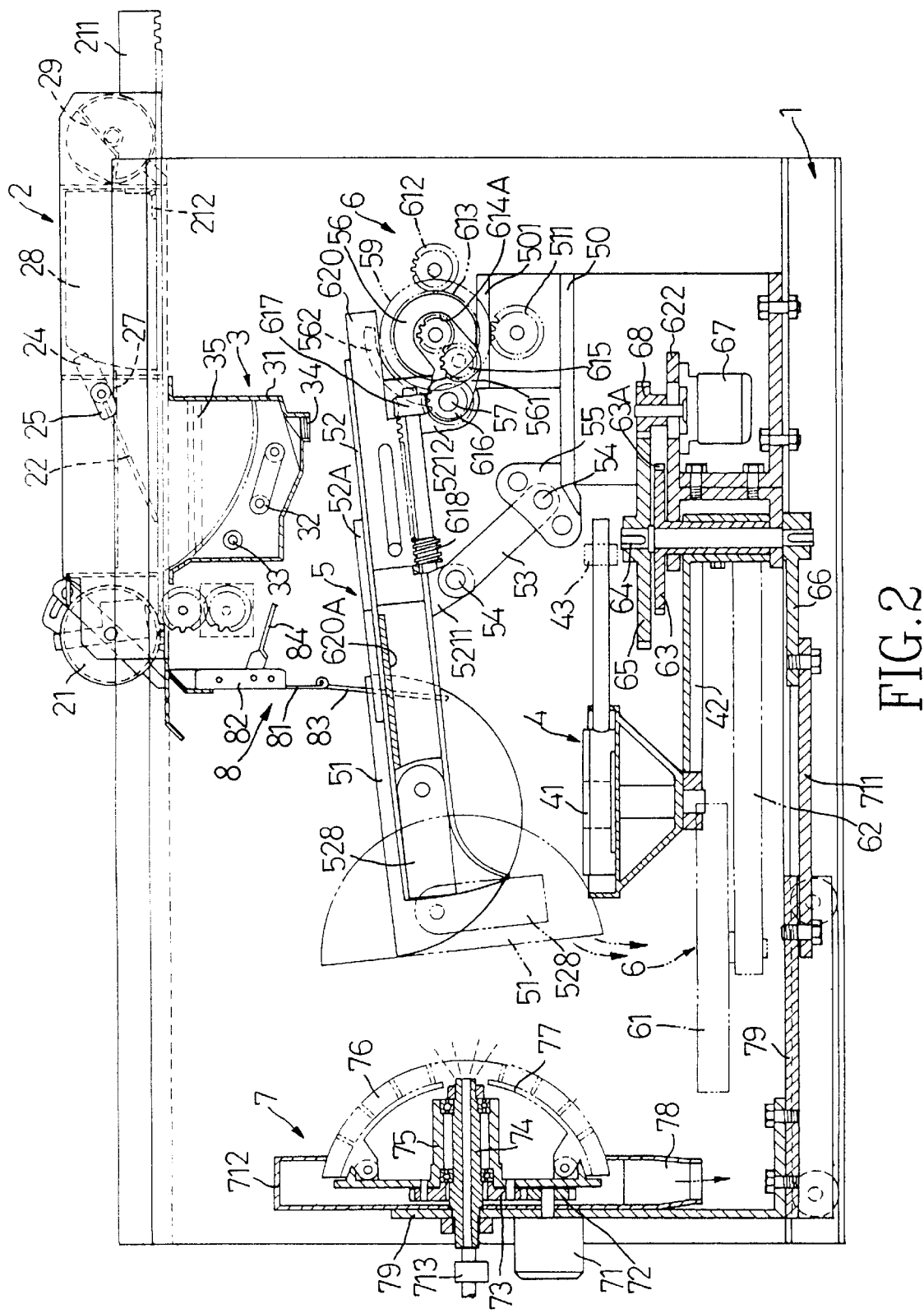
FIG. 2 is a cross sectional front plan view of the automatic cooking machine in FIG. 1.
Figure 3:
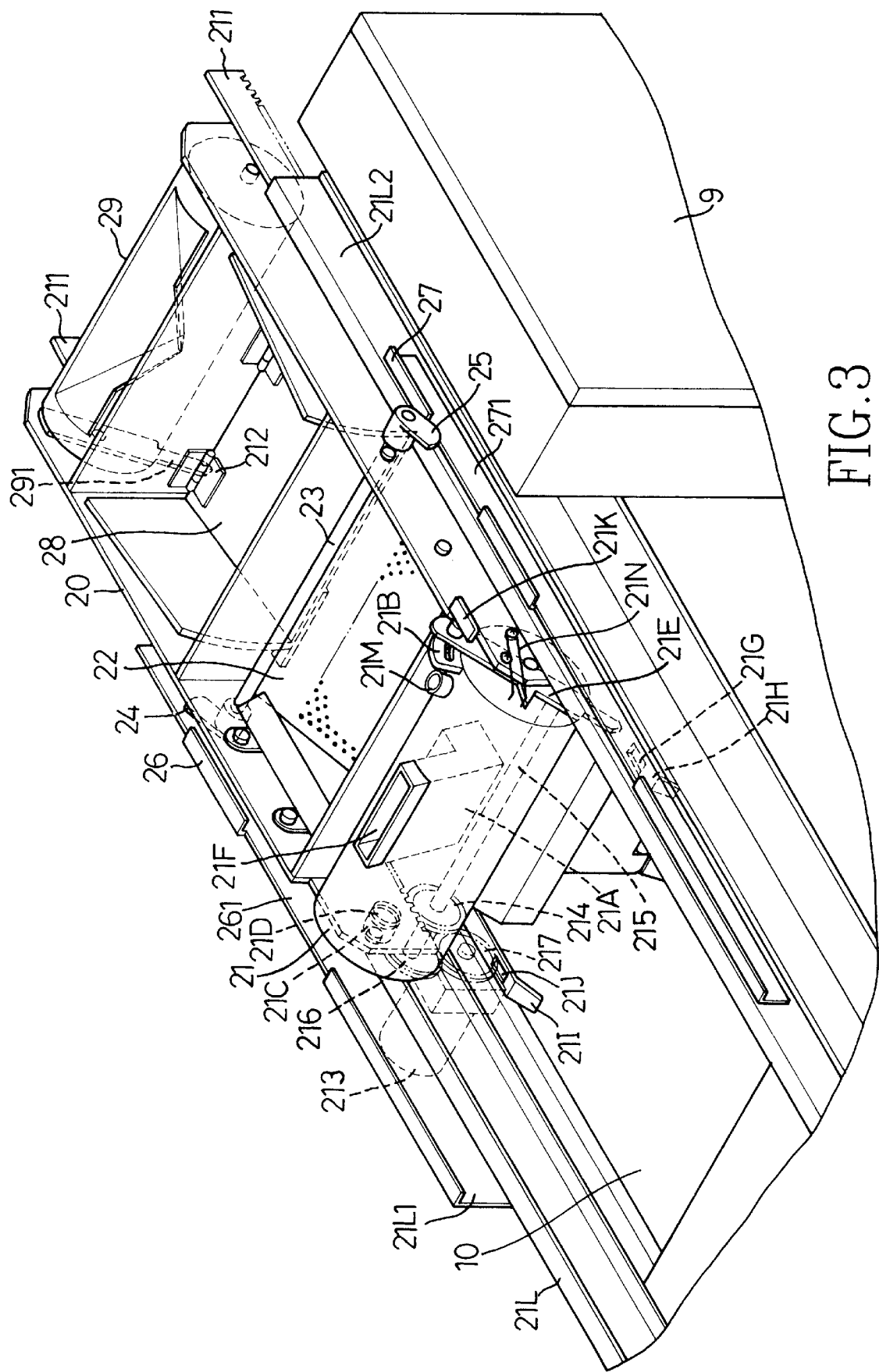
FIG. 3 is a perspective view of the feeding device of the automatic cooking machine in FIG. 1.

Referring to the drawings and initially to FIGS. 1–3, an automatic cooking machine accordance with the present invention comprises a feeding device (2), a deep-fry device (3), stove device (4), a cooker transmission device (5), a serving device (6), a washing device (7), a stir-fry device (8) and a panel (9) mounted on a base (1).

The feeding device (2) includes a frame (20) with multiple partitions to form a first chamber and a second chamber. A net axle (23) penetrates the first chamber, and a feeder (28) is pivotally mounted on the side opposite the first chamber in the second chamber by hinges (212). A deep-fry net (22) is attached to the net axle (23). A rationing oil feeder (21) is mounted near the first chamber, and a seasoning feeder (29) is mounted near the second chamber. A gear rack (211) is attached to each sidewall of the frame (20). A first sliding groove (21L1) and a second sliding groove (21L2) are attached to opposite sides of the top portion of the base (1) and each receives a corresponding gear rack (211) therein. A back plate (10) attached to the base (1) has a feeder motor (213) mounted on the top portion. A first motor gear (217) is attached to the feeder motor (213). A second gear (216) is attached to one end of a feeder axle (215). The second gear (216) is engaged with the first motor gear (217). One first gear (214) is mounted on the end of the feeder axle (215) opposite from the second gear (216), and another first gear (214) mounted near the second gear (216). Each of the two first gears (214) is received in the corresponding sliding groove (21L1, 21L2) and engaged with the corresponding gear rack (211). With such an arrangement, the frame (20) can be moved back and forth when the feeder motor (213) operates.

Figure 4:
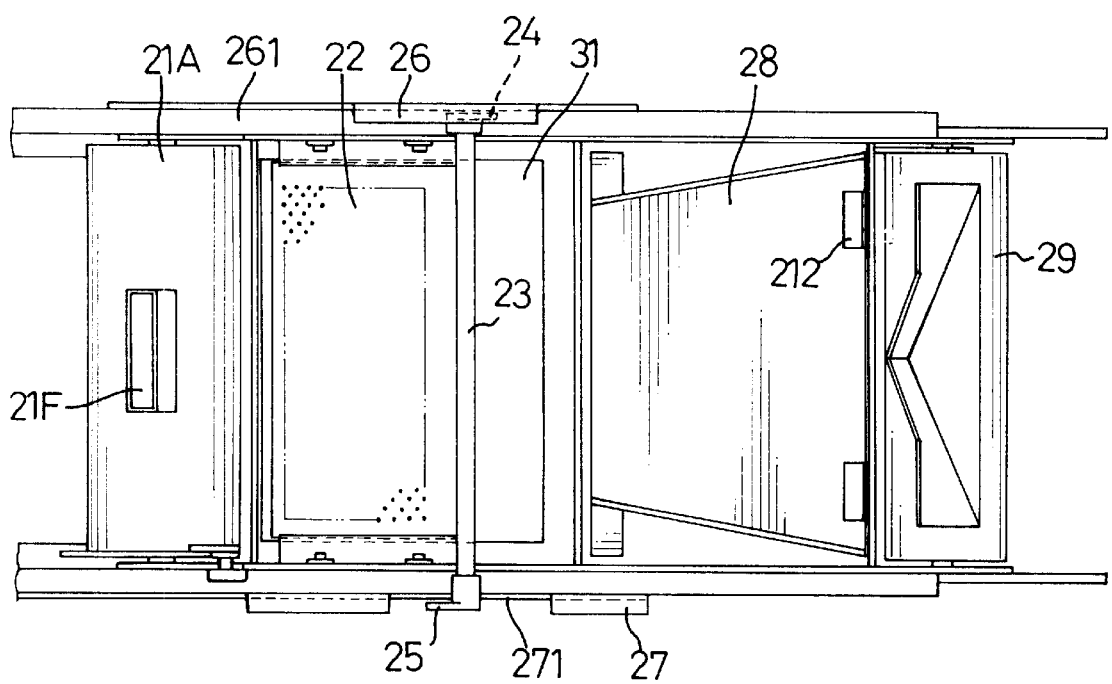
FIG. 4 is a top plan view of the feeding device of the automatic cooking machine in FIG. 2.
Figure 5A:
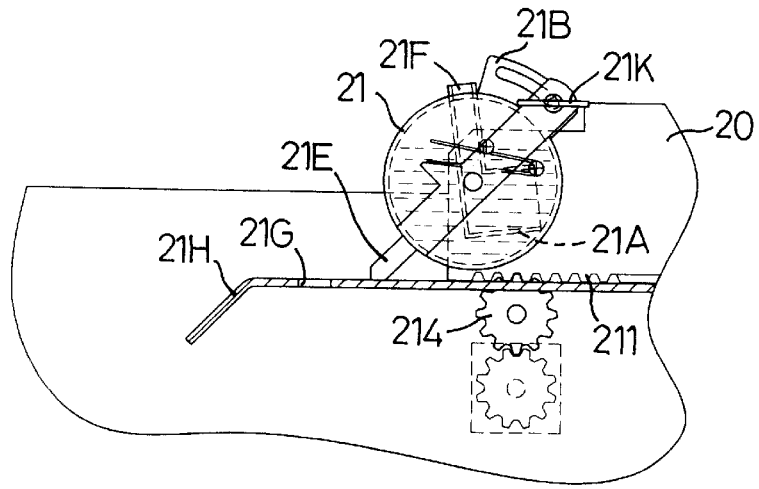
FIG. 5A is an operational front plan view in partial section of the rationing oil feeder of the automatic cooking machine in FIG. 1 before feeding the oil.
Figure 5B:
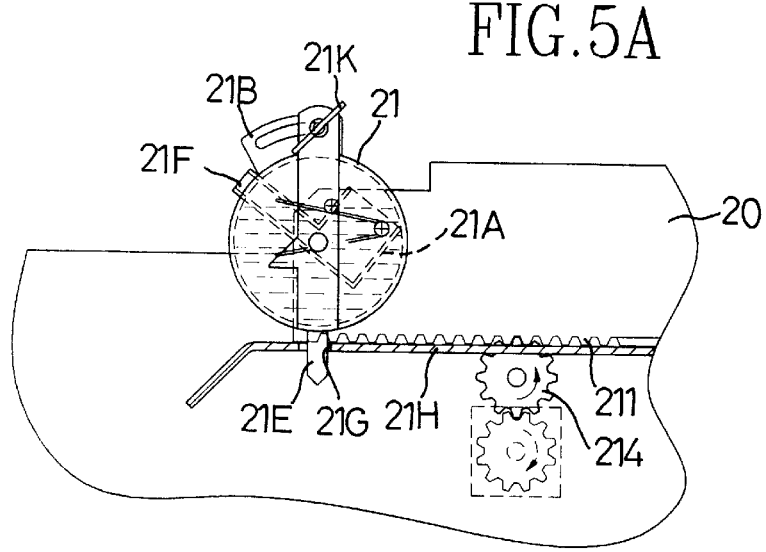
FIG. 5B is an operational front plan view in partial section of the rationing oil feeder of the automatic cooking machine in FIG. 1 when feeding the oil.
Figure 5C:
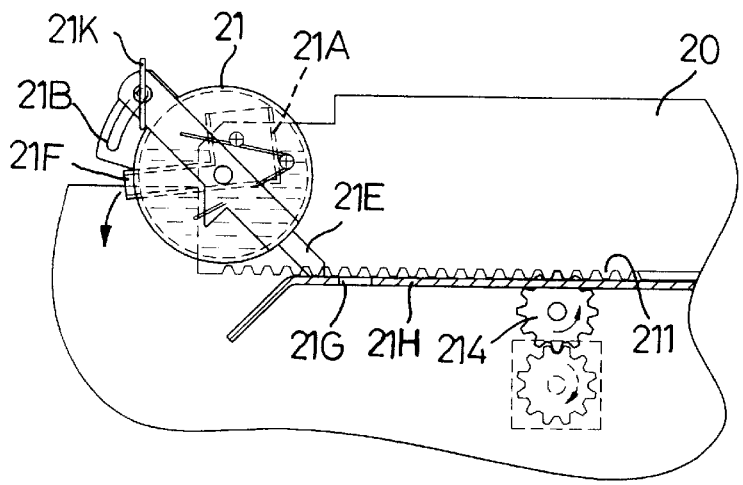
FIG. 5C is an operational front plan view in partial section of the rationing oil feeder of the automatic cooking machine in FIG. 1 when feeding the oil is complete.
Figure 6A:
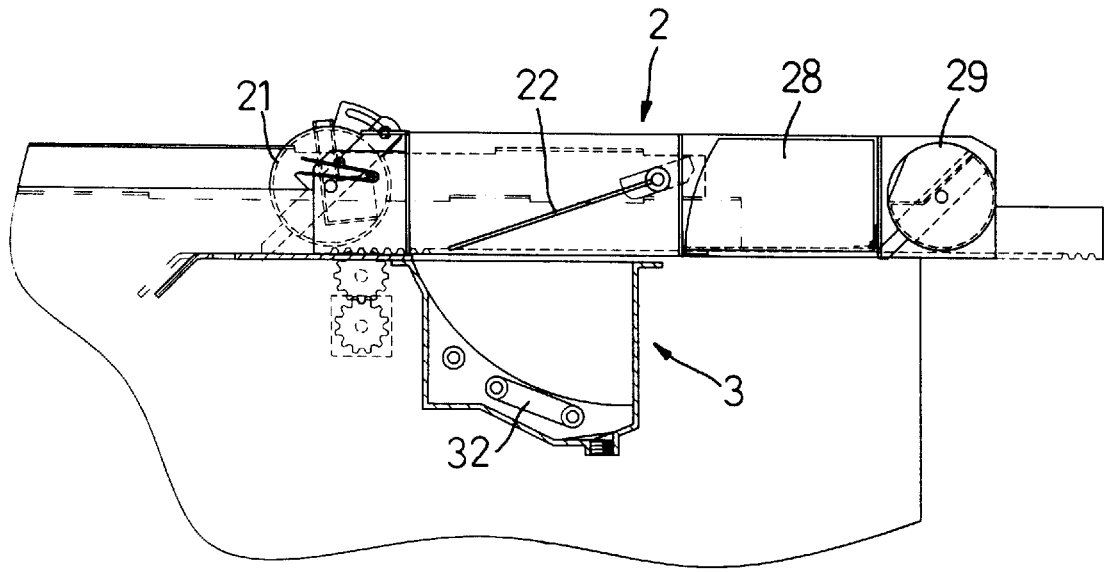
FIG. 6A is an operational front plan view of the feeding device of the automatic cooking machine in FIG. 1 before feeding.
Figure 6B:
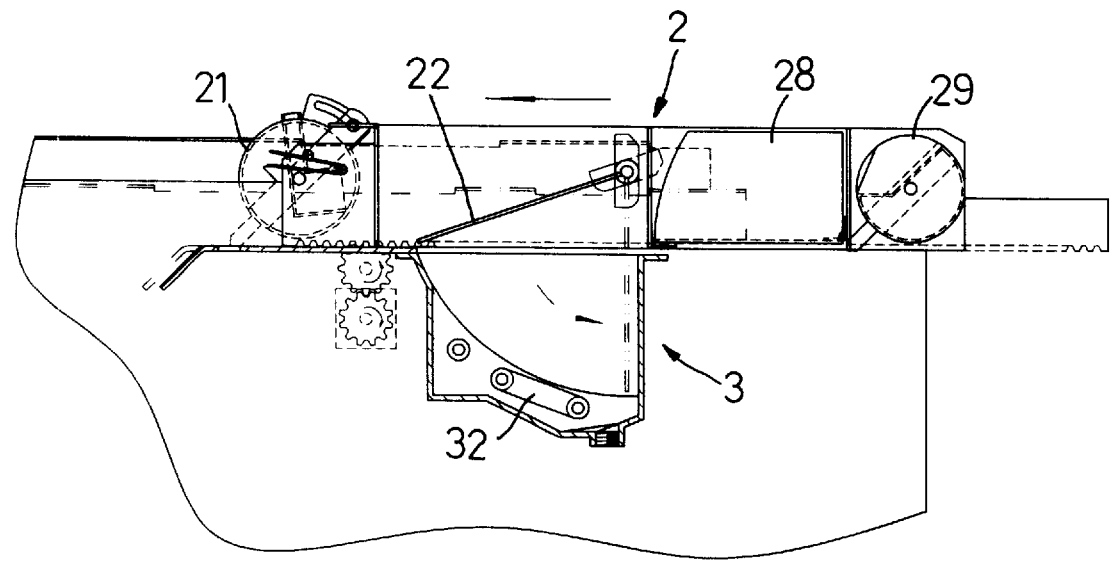
FIG. 6B is an operational front plan view that illustrate the relationship of the feeding device of the automatic cooking machine in FIG. 1 when the deep-fry net picks up materials in the deep-fry cooker.
Figure 6C:
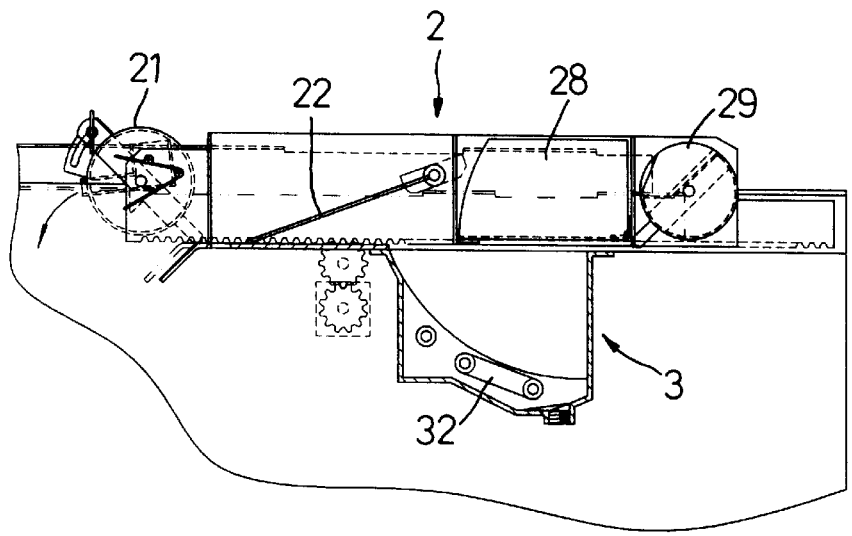
FIG. 6C is an operational front plan view that illustrates the relationship of the feeding device of the automatic cooking machine in FIG. 1 when the rationing oil feeder is feeding oil.
Figure 6D:
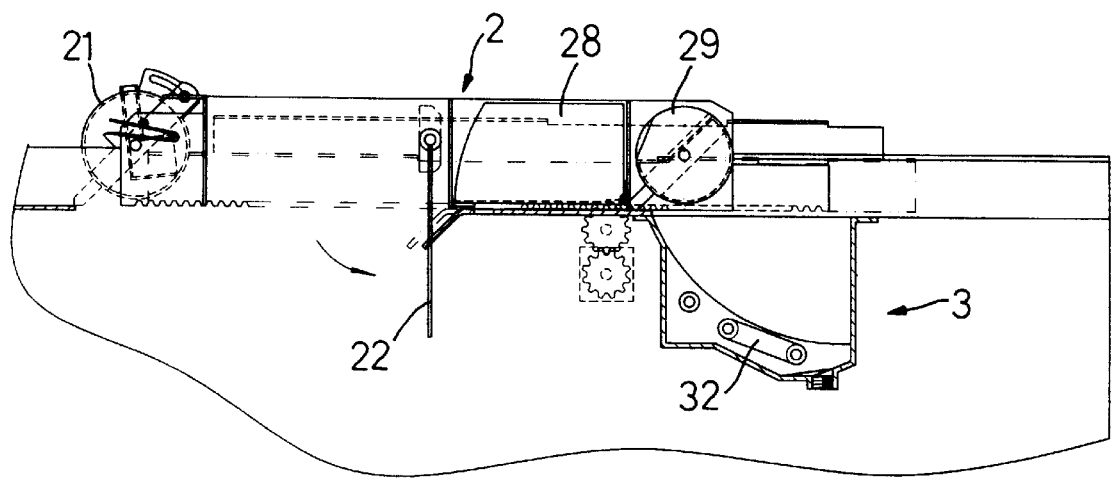
FIG. 6D is an operational front plan view that illustrates the relationship of the feeding device of the automatic cooking machine in FIG. 1 when the deep-fry net is down and puts materials into the stir-fry cooker.
Figure 6E:
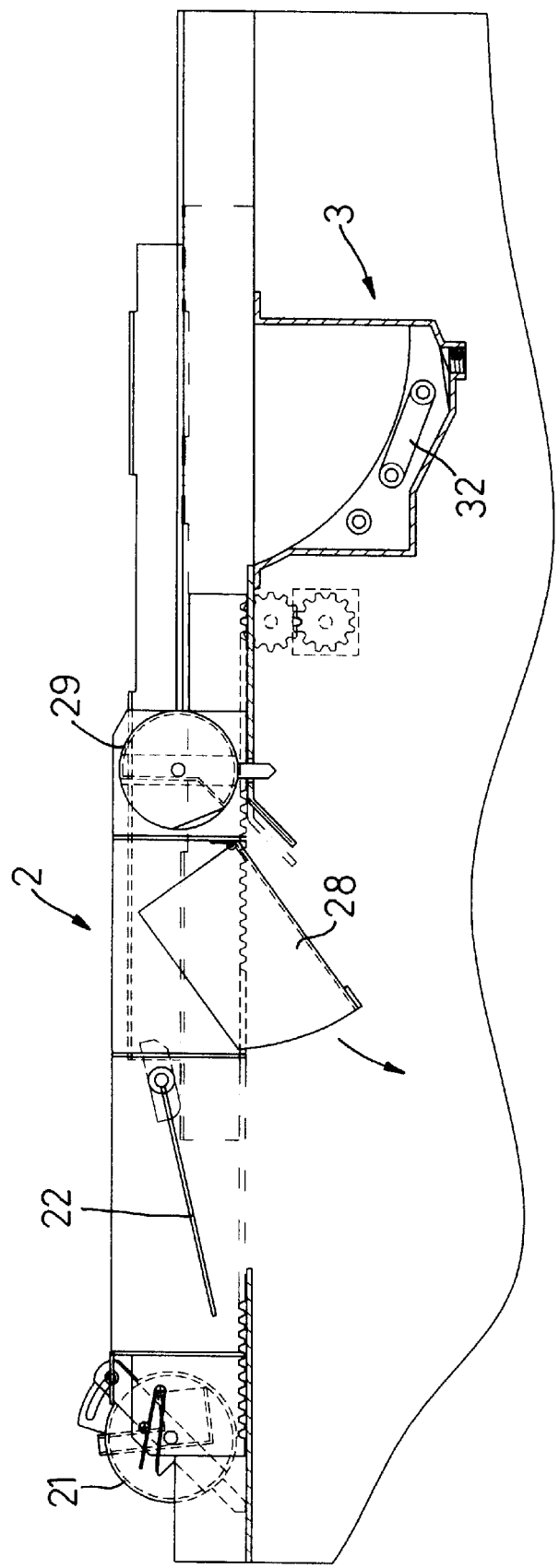
FIG. 6E is an operational front plan view that illustrates the relationship of the feeding device of the automatic cooking machine in FIG. 1 when the feeder is down and puts materials into the stir-fry cooker.

Referring to FIGS. 3, 4 and 5, the rationing oil feeder (21) is a cylinder and receives a rationing device (21A) therein. An oil feeder hub (21C) with a hub spring (21D) is attached to each side of the rationing oil feeder (21) to pivotally mount the rationing oil feeder (21) on the frame (20). By pushing the two oil feeder hubs (21C) and compressing the two hub springs (21D) at the same time, the total length of the rationing oil feeder (21) is shortened, and the rationing oil feeder (21) can be detached from the frame (20). The rationing oil feeder (21) contains a filler neck (21M) in the side of the cylindrical body to allow the rationing oil feeder (21) to be filled with oil. An oil control lever (21E) is attached to the oil feeder hub (21C) on the end of the rationing oil feeder (21) opposite to the feeder motor (213). An adjusting plate (21B) is attached to the edge of the rationing oil feeder (21). The adjusting plate (21B) and the oil control lever (21E) are connected by an adjusting knob (21K) that consists of a bolt and a wingnut (not numbered). The adjusting plate (21B) has an arcuate groove (not numbered) defined therein to allow the bolt of the adjusting knob (21K) to extend through and move therein. The oil control lever (21E) has a protrusion (not numbered) extending therefrom. A first return spring (21N) is mounted outside of the frame (20) and has one end abutting a locking piece (not numbered) on the frame (20) and the other end abutting the protrusion on the oil control lever (21E). An oil control rail (21H) is attached to the inside surface of the second sliding groove (21L2). A restoration force of the first return spring (21N) keeps the end of the oil control lever (21E) in contact with the oil control rack (21).

The deep-fry net (22) is attached to the net axle (23) and received in the first chamber of the frame (20). Each end of the net axle (23) extends through the frame (20). A first control lever (24) is attached to one end of the net axle (23), and a second control lever (25) is attached to the other end of the net axle (23). The orientation of the first control lever (24) and the second control lever (25) are opposite to each other. The first sliding groove (21L1) includes a first rail (26) with a third slot (261), and the second sliding groove (21L2) includes a second rail (27) with a fourth slot (271). The third slot (261) and the fourth slot (271) are corresponding with each other. A seasoning feeder (29) is pivotally mounted on the frame (20) on the opposite end from the rationing oil feeder (21). A seasoning control lever (291) attached to the seasoning feeder (29) on the end opposite to the oil control lever (21E) on the rationing oil feeder (21). The function and configuration of the seasoning control lever (291) are similar to the oil control lever (21E). A seasoning rail (21I) is attached to the inside of the first sliding groove (21L1), and the end of the seasoning control lever (291) is in contact with the seasoning rail (21I).

Referring to FIG. 2, the deep-fry device (3) is mounted on a top portion of the base (1). The deep-fry device (3) includes a deep-fry cooker (31) receiving a heater (32) and a temperature controller (33). The temperature controller (33) can sense the temperature of the oil (35) in the deep-fry cooker (31), and the heater (32) provides the heat source for the oil (35) during cooking. The deep-fry cooker (31) has an oil drain (34) in the bottom. The oil (35) in the deep-fry cooker (31) can be drained from the oil drain (34) after removing a plug (not numbered) from the oil drain (34).

Referring to the FIGS. 2, 5A–C and 6A–E, the frame (20) of the feeding device (2) can be moved ahead when the feeder motor (213) operates. The oil control lever (21E) slides along the oil control rail (21H) that has a first slot (21G) defined therein. As the rationing oil feeder (21) moves ahead, the oil control lever (21E) engages the first slot (21G) which causes the rationing oil feeder (21) to rotate whereby the rationing device (21A) can spoon up the oil from the rationing oil feeder (21). As the frame (20) continues to move and the rationing oil feeder (21) continues to rotate, the oil spooned up by the rationing device (21A) is poured into the stir-fry cooker (51) of the cooker transmission device (5) from a nozzle (21F) in the rationing oil feeder (21).

Referring to FIG. 3 and FIGS. 6A–E, when the second control lever (25) falls into the fourth slot (271) as the feeding device (2) moving forward, the deep-fry net (22) falls into the deep-fry device (3). The material on the deep-fry net (22) is then deep-fried in the deep-fry cooker (31). The start and the stop time of the forward movement of the frame (20) is controlled by the panel (9) to allow the material in the deep-fry cooker (31) to be fully fried. When the feeder motor (213) restarts and the frame (20) moves forward again, the first control lever (24) presses against the first rail (26) to make the net axle (23) rotate and lift the deep-fry net (22) up to scoop up the fried material from the deep-fry cooker (31). Then oil in the rationing device (21A) is poured into the stir-fry cooker (51) and the deep-fry net (22) rotates down to pour the fried material into the stir-fry cooker (51) when the deep-fry net (22) is moved over the oil control rail (21H) and the seasoning rail (21I). The feeder (28) pours the vegetables therein into the stir-fry cooker (51) when the feeder (28) moves over the oil control rail (21H) and the seasoning rail (21I). As the frame (20) continues to move forward, the seasoning control lever (291) engages a second slot (21J) defined in the seasoning rail (21I) to rotate the seasoning feeder (29) to scoop the seasoning in the seasoning feeder (29) into the stir-fry cooker (51). After the seasoning is dumped into the stir-fry cooker (51), the frame (20) contacts a micro switch that reverses the feeder motor causing the seasoning feeder (29), the feeder (28), the deep-fry net (22) and the rationing oil feeder (21) to return to their original position.

The volume of oil spooned up by the rationing device (21A) can be adjusted by loosening the adjusting knob (21K) and rotating the rationing oil feeder (21) cylinder and retightening the adjusting knob (21K). The angle of the oil control lever (21E) to the adjusting plate (21B) can be adjusted before operating the cooking machine to determine the volume of oil spooned up by the rationing device (21A) after loosing the adjusting knob (21K). The restoration force of the first return spring (21N) can reverse and balance the rationing oil feeder (21) to prevent the oil in the rationing oil feeder (21) from overturning after the oil control lever (21E) detaches from the slot (21G) in the oil control rail (21H).

Figure 7:
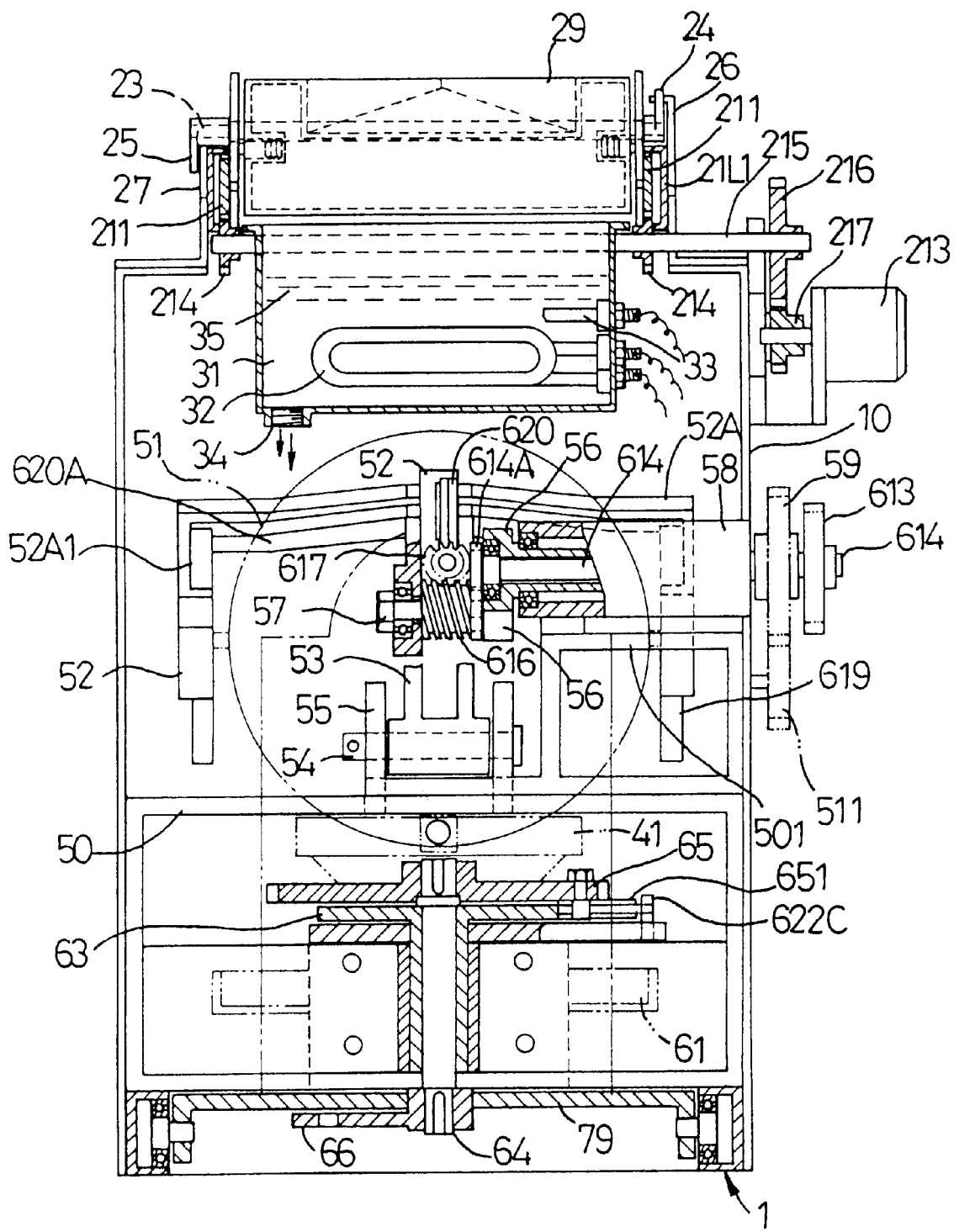
FIG. 7 is a cross sectional side plan view of the automatic cooking machine in FIG. 1.
Figure 8:
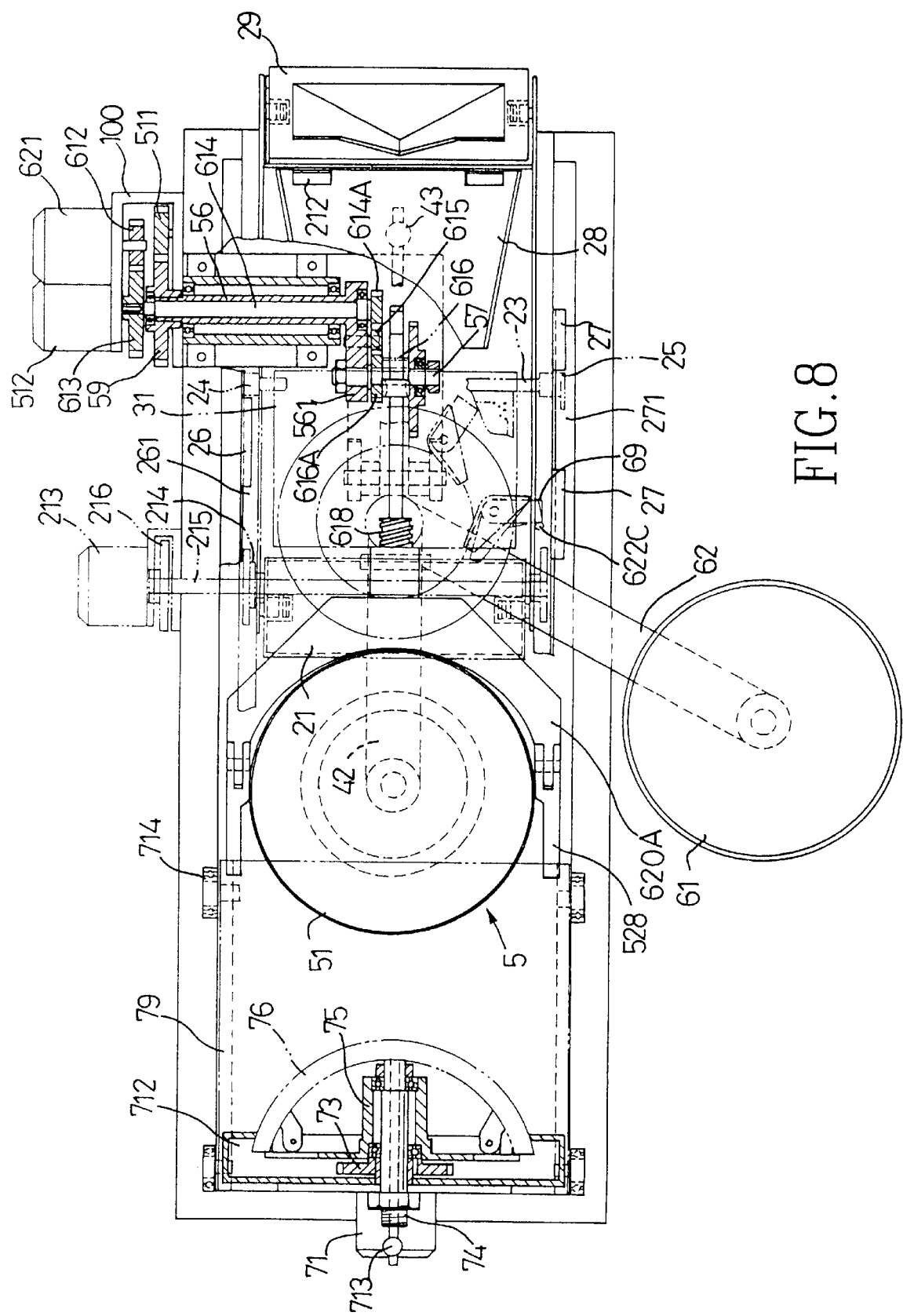
FIG. 8 is a cross sectional top plan view of the automatic cooking machine in FIG. 1.
Figure 9:
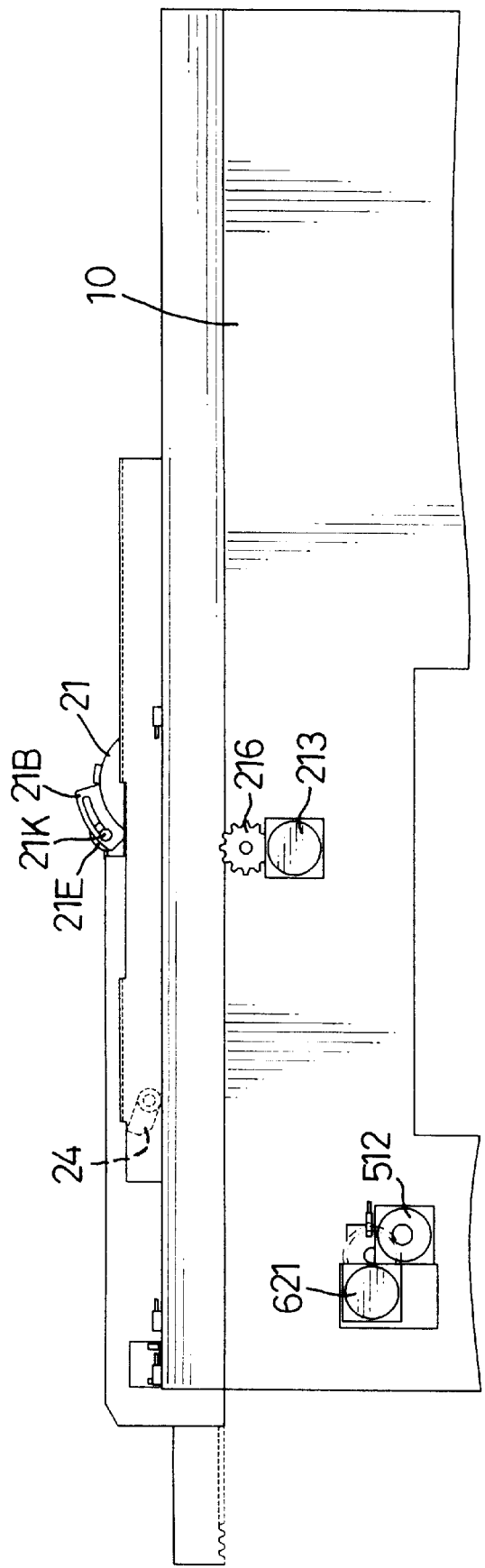
FIG. 9 is a partial rear plan view of the automatic cooking machine in FIG. 1.

Referring to FIG. 2 and FIGS. 7–8, an inner support (50) is mounted on the base (1) and a support (501) is mounted on a top portion of the inner support (50) near the back plate (10). The cooker transmission device (5) is attached to the inner support (50), and the serving device (6) is attached to the support (501). The back plate (10) as shown in FIG. 8 has a bracket (100) attached thereto. A stir-fry motor (512) and a serving motor (621) are mounted on the bracket (100). A transmission seat (58) is attached to the support (501), and an eccentric shaft (56) is pivotally mounted on the transmission seat (58) by a bearing (not shown). The eccentric shaft (56) is hollow and receives a serving shaft (614) therein. An eccentric gear (59) is attached to one end of the eccentric shaft (56), and an eccentric block (561) is attached to the other end. A cooker gear (511) is attached to the stir-fry motor (512) and engaged with the eccentric gear (59) to drive the eccentric shaft (56). A serving middle gear (615) and an eccentric gear shaft (57) are attached to the eccentric block (561). A gear (616A) is attached to the free end of the eccentric gear shaft (57). A first worm (616) extends from the gear (616A) which is engaged with the serving middle gear (615). A serving shaft gear (614A) is attached to the serving shaft (614) and engaged with the serving middle gear (615).

Referring to FIG. 2 and FIG. 7, the cooker transmission device (5) includes a Π-shaped sheet (52A) having two sides each bent to form a groove (52A1). A U-shaped connecting arm (620A) has two sides each received in the opposite groove (52A1). As shown in FIG. 8, a rotating plate (528) is attached to the interior of each side of the connecting arm (620A), and the stir-fry cooker (51) is mounted between the two rotating plate (528). The connecting arm (620A) has a serving gear rack (620) attached to the end opposite to the stir-fry cooker (51). The sheet (52A) includes a stir-fry rod (52) mounted on the end opposite to the stir-fry cooker (51). The stir-fry rod (52) is n-shaped to receive the serving gear rack (620) therein. The stir-fry rod (52) includes a first lug (5211) extending down from one end and a second lug (5212) extending down from the other end. A seat (55) is attached to the inner support (50). One end of a rocker linkage (53) is pivotally attached to the seat (55) and the other is pivotally attached to the first lug (5211) by pivot pins (54). The second lug (5212) has a bore (not numbered) to receive the free end of the eccentric gear shaft (57). A shaft (not numbered) is mounted between the first lug (5211) and the second lug (5212). A second worm (618) formed on one end of the shaft is engaged with the serving gear rack (620), and another worm gear (617) is formed on the other end.

Referring to the FIGS. 7–8, the worm gear (617) is engaged with the first worm (616) which extends from the gear (616A) and is engaged with the serving middle gear (615). The eccentric gear (59) drives the eccentric shaft (56) and the eccentric block (561) to make the eccentric gear (57) reciprocate the second lug (5212) when the stir-fry motor (512) is operated to rotate the cooker gear (511). Further referring to FIG. 10, the stir-fry rod (52) and the Π-shaped sheet (52A) are swung because the second lug (5212) extends from the stir-fry rod (52).

Figure 11:
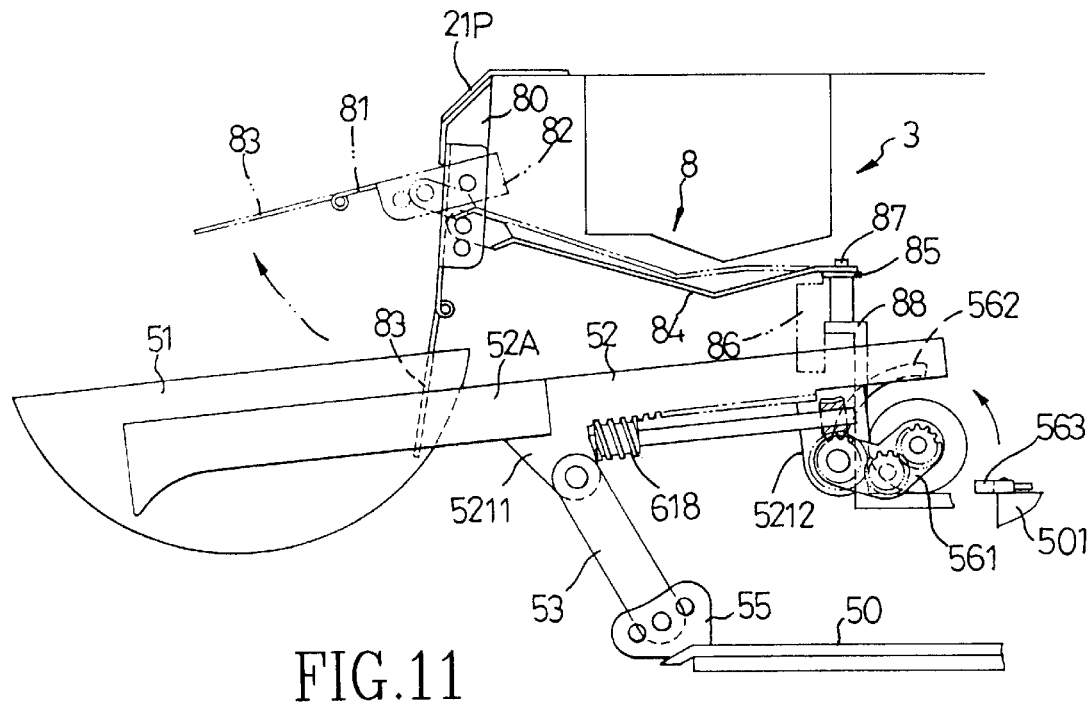
FIG. 11 is an operational front plan view of the stir-fry spatula and the stir-fry cooker of the automatic cooking machine in FIG. 1 preparing to serve food.
Figure 12:
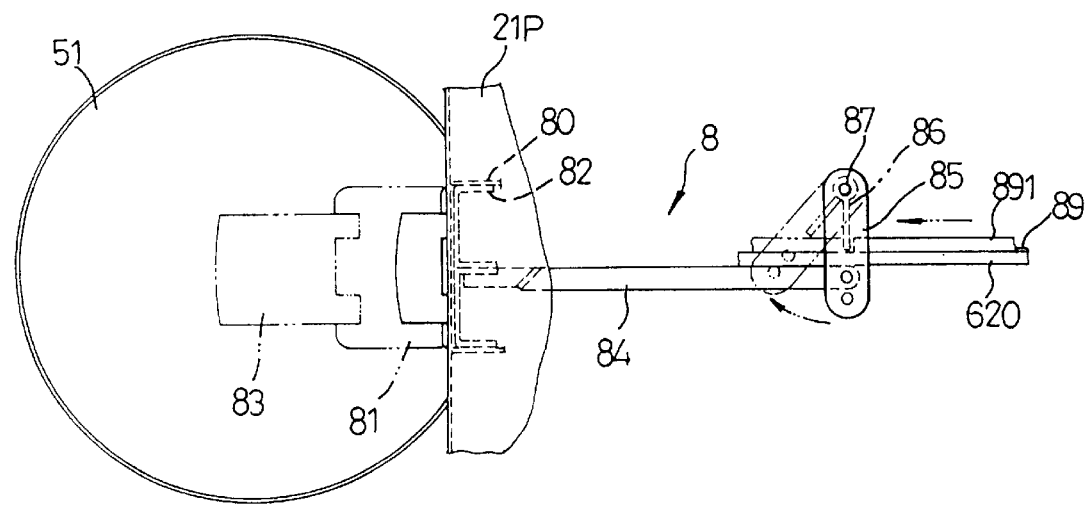
FIG. 12 is a top plan view of the stir-fry spatula and the stir-fry cooker of the automatic cooking machine in FIG. 1.

The stir-fry device (8) is attached to the frame (20) by a positioning plate (80). With reference to FIGS. 2, 11 and 12, a pivot plate (81) with two ears (82) is pivotally mounted on the positioning plate (80). A stir-fry spatula (83) is pivotally attached to the pivot plate (81) and extends into the stir-fry cooker (51). The stir-fry spatula (83) abuts the inner surface of stir-fry cooker (51) and turns over the material in the stir-fry cooker (51) like a spatula operated by a cook when the Π-shaped sheet (52A) is swung.

With reference to FIG. 2, the stove device (4) includes a gas burner (41) that is attached to the base (1) by a link rod (42). An electromagnetic valve (43) is attached to the gas burner (41) and controlled by the PLC on the panel (9). The electromagnetic valve (43) controls whether the gas burner (41) is burning or not. A push rod (84) is pivotally attached to the ear (82) of the pivot plate (81). A bracket (88) is attached to the back plate (10). A thumb plate (86) with a sleeve (not numbered) formed on one edge is pivotally mounted on the bracket (88) by a pivot pin (87). One end of a connecting rod (85) is attached to the thumb plate (86) and the other end is attached to the push rod (84).

Referring to FIG. 11, an arcuate plate (562) is attached to the eccentric block (561) and a photoelectric sensor (563) is attached to the support (501). The arcuate plate (562) pass through the field of view of the photoelectric sensor (563) when the eccentric block (561) rotates. The photoelectric sensor (563) drives the number of times the arcuate plate (562) passing through the photoelectric sensor (563) to the PLC on the panel (9). The PLC on the panel (9) will stop the stir-fry motor (512) when the number of times is greater than the set number of the PLC on the panel (9). Then stir-frying is complete, and cooking machine enters the serving cycle.

Referring to FIG. 2 and FIGS. 7–8, a serving base (622) is mounted on the bottom of the base (1). A motor (67) is attached to the serving base (622), and a link rod plate (63) is pivotally mounted on the serving base (622) by a main axle (64). The link rod (42) and a serving link rod (62) are attached to the side of the link rod plate (63). A serving tray (61) is attached to the free end of the serving link rod (62), and the gas burner (41) is attached to the free end of the link rod (42). A main gear (65) is attached to one end of the main axle (64), and a third motor gear (68) is attached to the motor (67). The main gear (65) is engaged with the third motor gear (68). A main link rod (66) is attached to the other end of the main axle (64) and connects with the washing device (7).

Figure 13:
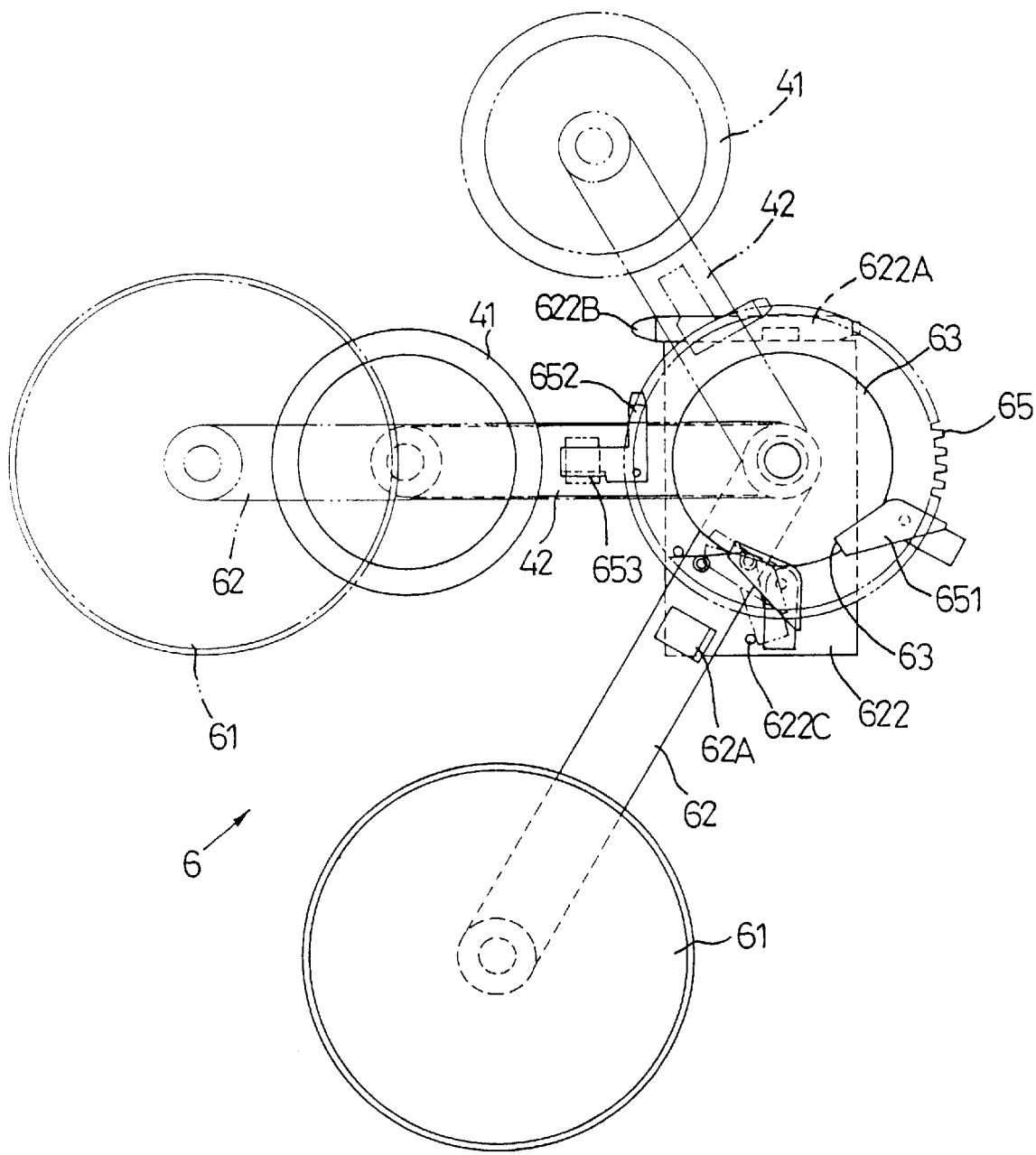
FIG. 13 is a partial top plan view of the serving device of the automatic cooking machine in FIG. 1.

Referring to FIG. 13, a check pawl (651) and an inclined bar (652) with a second pull bar (653) are attached to the bottom of the main gear (65). The periphery of the link rod plate (63) contains a recess (63A) therein. A balance rod (622A) is pivotally attached to one side of the serving base (622). A second stopper (622C) is attached to the serving base (622). The top portion of the balance rod (622A) forms a hook (622B). A first pull rod (62A) is attached to the top portion of the serving link rod (62). The PLC on the panel (9) will start the motor (67) and rotate the third motor gear (68) that drives the main gear (65) when the stir-fry cooker (51) completes the stir-fry cycle. Then the check pawl (651) attached to the main gear (65) abuts the recess (63A) of the link rod plate (63) to rotate the link rod plate (63). Therefore the link rod (42) and the serving link rod (62) are rotated to the back plate (10). The link rod (42) is held in place by the hook (622B) of the balance rod (622A) when the link rod (42) touches the balance rod (622A), and the stir-fry cooker (51) begins to serve.

Figure 10:
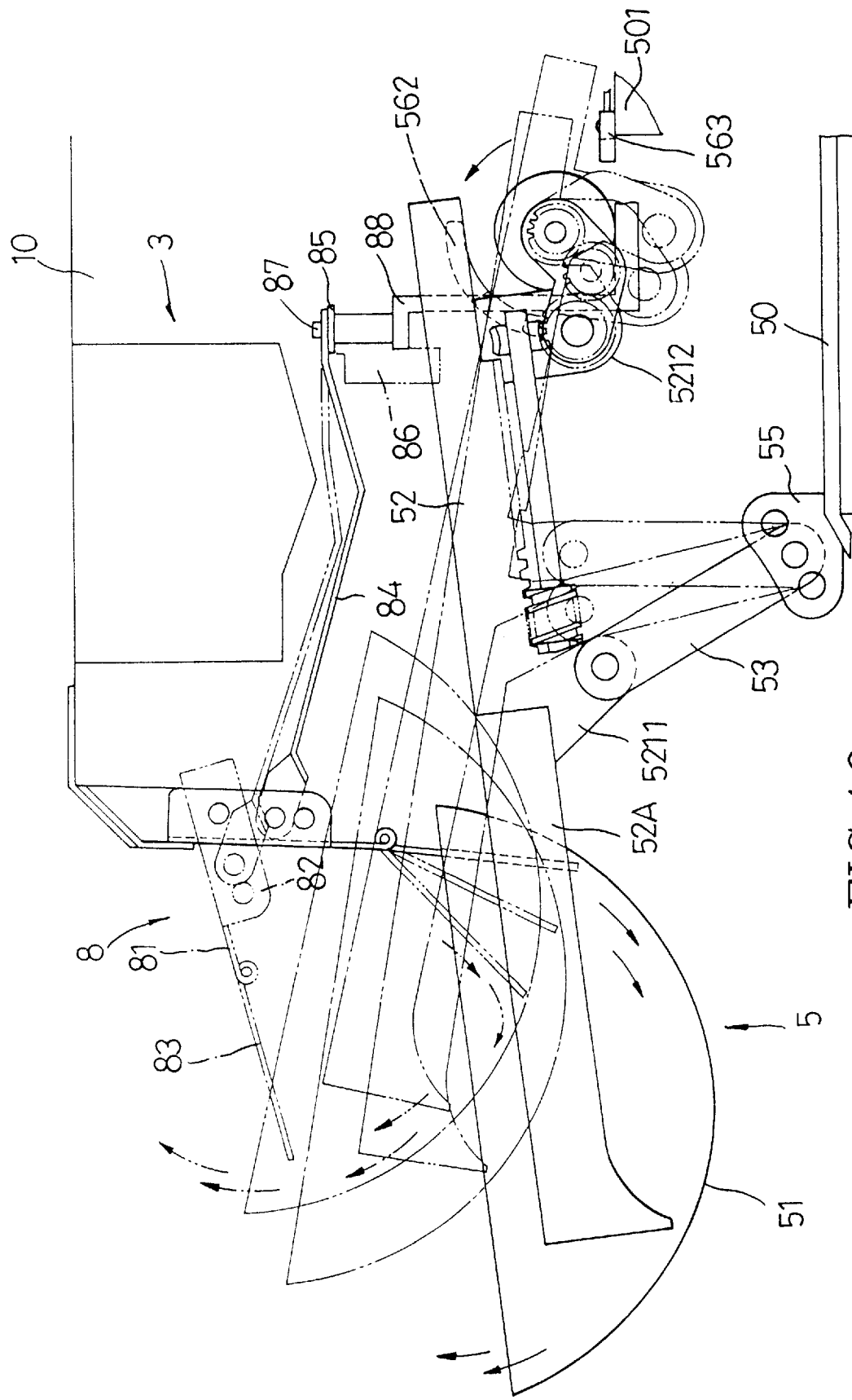
FIG. 10 is an operational front plan view of the stir-fry spatula and the stir-fry cooker of the automatic cooking machine in FIG. 1 during cooking.

Referring to FIGS. 2 and 8, the serving gear (613) and the serving shaft (614) are driven when the serving motor (621) is operated to rotate the second motor gear (612). Then the serving shaft gear (614A) drives the serving middle gear (615) and the gear (616A) to make the first worm (616) drive the worm gear (617). The serving gear rack (620) moves forth when the worm gear (617) is operated. Referring to FIGS. 10–12, a push plate (89) with a convex side (891) is attached to one side of the serving gear rack (620). The convex side (891) of the push plate (89) pushes the thumb plate (86) to make the connecting rod (85) push the push rod (84) and the pivot plate (81). Then the stir-fry spatula (83) is lifted and positioned so the stir-fry cooker (51) can turn upside down and dump the material therefrom.

Referring to FIGS. 14–16, the stir-fry cooker (51) mounted on the top portion of the connecting arm (620A) is pushed forth because the serving gear rack (620) pushes the connecting arm (620A). One side of the connecting arm (620A) has a connecting plate (620B) attached thereto. A push block (620C) extends from the connecting plate (620B). The end of the Π-shaped plate (52A) opposite to the stir-fry cooker (51) has a side rod (522) and a side push rod (524) attached thereto. A first stopper (525) extends from the side push rod (524) to abut the push block (620C). A second return spring (523) has one end attached to the side rod (522) and the other end attached to the side push rod (524). A rotating plate (528) is pivotally mounted on each end of the connecting arm (620A) and connects to the stir-fry cooker (51). One end of a linkage (527) is pivotally attached to the free end of the rotating plate (528) and the other end is slidably and pivotally mounted on the free end of the side push rod (524). The push block (620C) pushes the first stopper (525) to make the side push rod (524) push the linkage (527) when the connecting arm (620A) slides forth. The stir-fry cooker (51) dumps the stir-fried food into the serving tray (61) when the rotating plate (528) is pushed and extends over the connecting arm (620A). The first stopper (525) driven by the push block (620C) contacts the stop rod (526) when the connecting arm (620A) moves forth. The linkage (527) pulls the rotating plate (528) again to make the stir-fry cooker (541) incline when the push block (620C) contacts the stop rod (526). The first stopper (525) detaches from the push block (620C) after contacting the stop rod (526). Then the restoration force of the second return spring (523) pulls the side push rod (524) to shake the stir-fry cooker (51) to ensure all the stir-fried food is dumped into the serving tray (61). The serving tray (61) is taken away, and the cooking machine enters the washing cycle.

Referring to FIG. 2, the washing device (7) includes a moving seat (79) rolling on the base (1) and a connecting bar (711) which has one end pivotally mounted on the moving seat (79) and the other end pivotally mounted on the main link rod (66). A casing (712) and a washing motor (71) are mounted on the moving seat (79). The casing (712) contains a water outlet (78) defined in the bottom thereof. A cleaner shaft (74) with spray holes (not numbered) is mounted on the moving seat (79) and has one end extending through the automatic cooking machine. A electromagnetic water valve (713) is attached to the outer end of the cleaner shaft (74). A cleaner gear (73) is pivotally mounted around the cleaner shaft (74). A fourth motor gear (72) is attached to the washing motor (71) and engaged with the cleaner gear (73). A cleaner wheel (75) is mounted around the cleaner shaft (74) and attached to the cleaner gear (73). A centrifugal plate (77) with multiple brushes (76) is attached to the cleaner wheel (75).

Referring to FIG. 13, the check pawl (651) inserts into the recess (63A) to drive the link rod plate (63) when the main gear (65) rotates. The check pawl (651) will detach from the recess (63A) when contacting the second stopper (622C).

Figure 17:
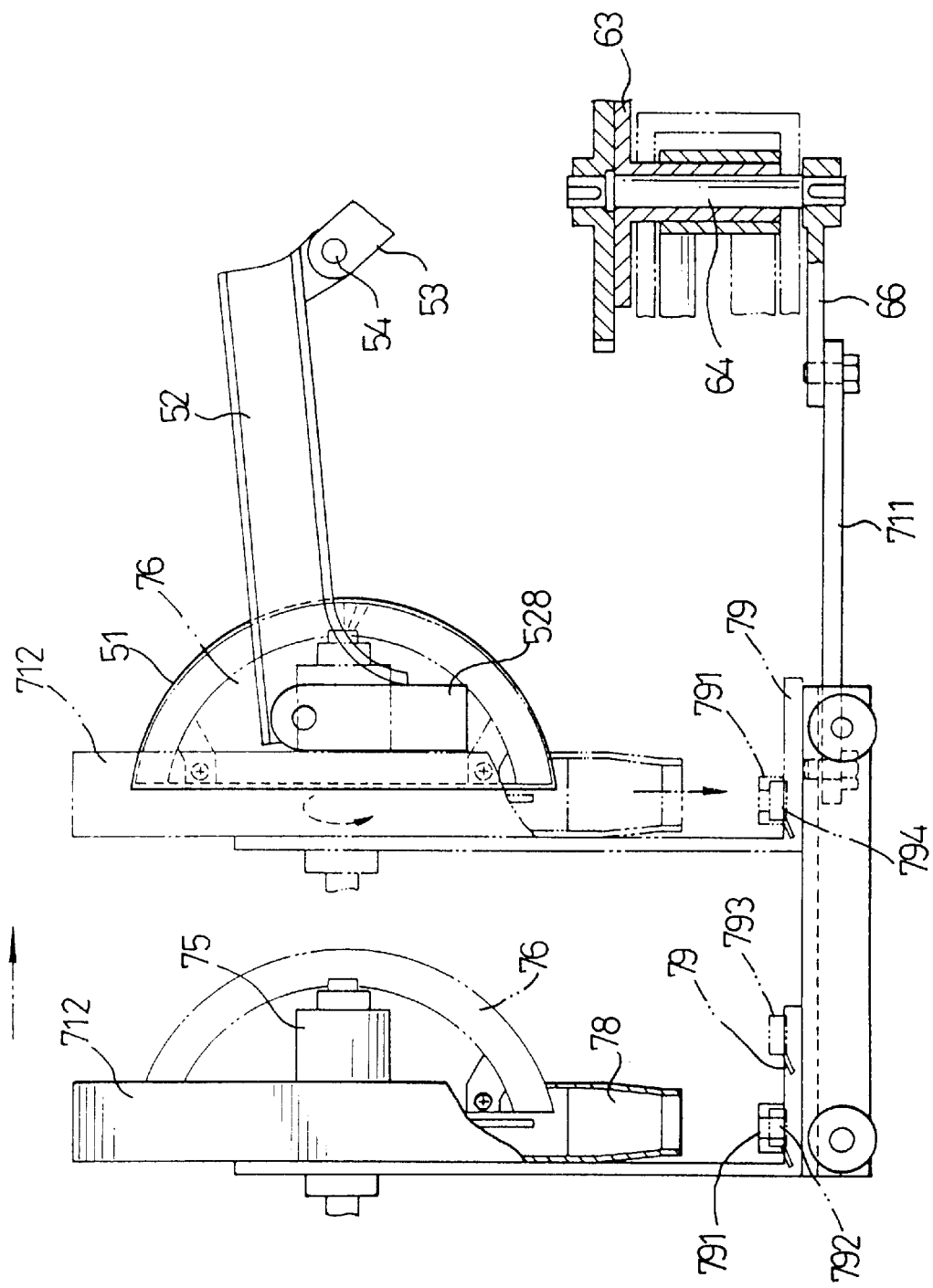
FIG. 17 is a front plan view of the washing device of the automatic cooking machine in FIG. 1.
Figure 18:
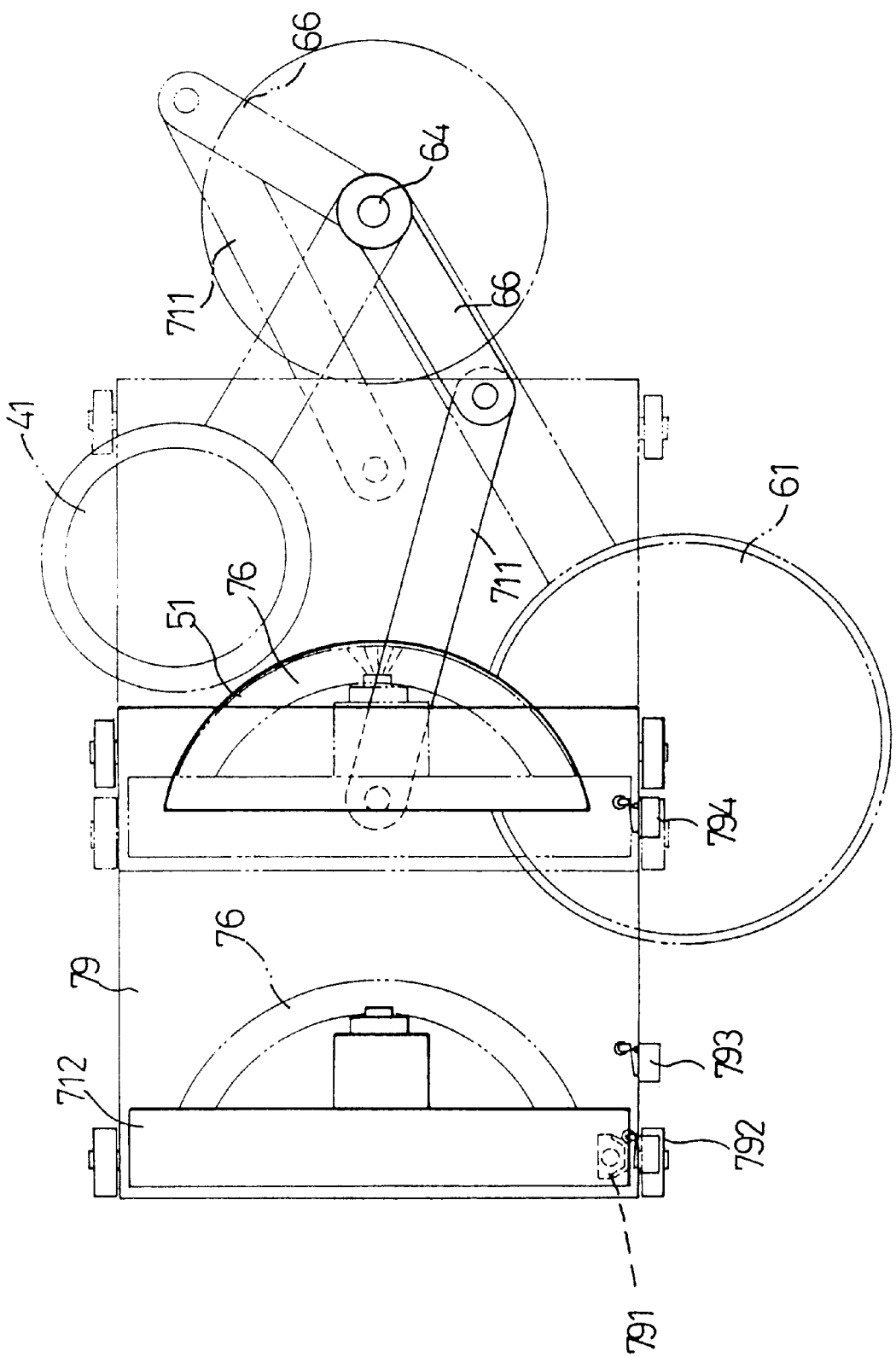
FIG. 18 is top plan view of the washing device in FIG. 17.

Then the link rod (42) is hooked by the hook (622B) and the serving tray (61) is ready to receive the material from the stir-fry cooker (51). The inclined bar (652) will press the balance rod (622A) to make the link rod (42) detach from the hook (622B), and the serving tray (61) takes the stir-fried food away from the automatic cooking machine when serving is complete and the main gear (65) rings forth again. Further referring to FIG. 2 and FIGS. 17–18, the main shaft (64) rotates to drive the main link rod (66) and the connecting bar (711) to make the moving seat (79) approach the stir-fry cooker (51) and allow the brushes (76) to contact the inside of the stir-fry cooker (51). Then a block (791) attached to the moving seat (79) abuts a third micro-switch (794) to stop the motor (67), start the washing motor (71) and make the water electromagnetic valve (713) open to allow the water to flow. The cleaner wheel (75) and the and the centrifugal plate (77) are rotated to make the brushes (76) scrub the stir-fry cooker (51), and the water is drained from the water outlet (78).

Although the invention has been explained in relation to its preferred embodiment, it is to be understood that many other possible modifications and variations can be made without departing from the spirit and scope of the invention as hereinafter claimed.

What is claimed is:

1. An automatic cooking machine comprising:
    a base (1);
    a feeder device (2) mounted on said base (1);
    a deep-fry device (3) mounted on said base (1);
    a stove device (4) mounted on said base (1);
    a cooker device (5) mounted on said base (1);
    a serving device (6) mounted on said base (1);
    a washing device (7) mounted on said base (1);
    a stir-fry device (8) mounted on said base (1); and
    a panel (9) mounted on said base (1); said panel (9) including a PLC (program logic controller) mounted therein to control said feeder device (2), said deep-fry device (3), said stove device (4), said cooker device (5), said serving device (6), said washing device (7) and said stir-fry device (8).

2. The automatic cooking machine as claimed in claim 1, wherein said feeding device (2) includes:
    a frame (20) with multiple partitions to form a first chamber and a second chamber, a deep-fry net (22) pivotally mounted in said first chamber;
    a feeder (28) mounted in said second chamber;
    a rationing oil feeder (21) pivotally mounted on said frame (20) near said deep-fry net (22);
    a seasoning feeder (29) mounted on said frame (20) near said feeder (29);
    two sliding grooves (21L1; 21L2) attached to the top portion of said base (1) each receiving a gear rack (211) therein;
    a back plate (10) attached to said base (1);
    a feeder motor (213) with a first motor gear (217) attached to said back plate (10); and
    a feeder shaft (215) having a second gear (216) attached thereto to engaged with said first motor gear (217) and two first gears (214) attached thereto each engaged with said gear rack (211).

3. The automatic cooking machine as claimed in claim 2, wherein said rationing oil feeder (21) is a cylinder closed ends and includes:
    a rationing device (21A) mounted in said rationing oil feeder (21);

two oil feeder hubs (21C) each with a hub spring (21D) extending from each end of said rationing oil feeder (21), said two oil feeder hubs (21C) each pivotally mounted on said frame (20);

a filler neck (21M) attached to the periphery of said rationing oil feeder (21) and communicating with said rationing oil feeder (21);

an oil control plate (21E) pivotally mounted on one end of said rationing oil feeder (21), said oil control plate (21E) having an adjusting knob (21K) attached to the top portion thereof;

an adjusting plate (21B) attached to said periphery of said rationing oil feeder (21) and containing an adjusting groove to allow said adjusting knob (21K) to extend through; and a first return spring (21N) mounted outside of said frame (20) having one end abutting a locking piece on said frame (20) and the other end abutting a protrusion extending from said oil control plate (21E).

4. The automatic cooking machine as claimed in claim 1, wherein said automatic cooking machine includes a deep-fry device (3) mounted on the top portion of said base (1) and including a deep-fry cooker (31) mounted thereon to receive a heater (32) and a temperature controller (33) therein.

5. The automatic cooking machine as claimed in claim 2, wherein said automatic cooking machine includes a deep-fry device (3) mounted on the top portion of said base (1) and including a deep-fry cooker (31) mounted thereon to receive a heater (32) and a temperature controller (33) therein.

6. The automatic cooking machine as claimed in claim 1, wherein said automatic cooking machine includes:
an inner support (50) attached to said base (1);
a support (501) attached to the top of said inner support (50) and near said back plate (10);
a cooker transmission device (5) attached to said top of said inner support (50); and
a serving device (6) attached to said support (501).

7. The automatic cooking machine as claimed in claim 1, wherein said automatic cooking machine includes:
a bracket (100) attached to the backside of said back plate (10);
a stir-fry motor (512) and a serving (621) each mounted on said bracket (100);
a transmission seat (58) attached to said support (501) and having a hollow eccentric shaft (56) pivotally mounted thereon; said eccentric shaft (56) including one end having an eccentric gear (59) attached thereto and the other end having a eccentric block (561) attached thereto;
a cooker gear (511) attached to said stir-fry motor (512) and engaged with said eccentric gear (59);
a serving middle gear (615) pivotally mounted on said eccentric block (561);
an eccentric gear shaft (57) pivotally mounted on said eccentric block (561);
a gear (616A) pivotally mounted on said eccentric gear shaft (57) and having a first worm (616) extending therefrom, said gear (616A) engaged with said serving middle gear (615);
a serving shaft (614) received in said eccentric shaft (56) and having two ends each extending through said eccentric shaft (56); and
a serving shaft gear (614A) attached to one end of said serving shaft (614) and engaged with said serving middle gear (615).

8. The automatic cooking machine as claimed in claim 5, wherein said automatic cooking machine includes:
a bracket (100) attached to the backside of said back plate (10);
a stir-fry motor (512) and a serving (621) each mounted on said bracket (100);
a transmission seat (58) attached to said support (501) and having a hollow eccentric shaft (56) pivotally mounted thereon; said eccentric shaft (56) including one end having a eccentric gear (59) attached thereto and the other end having a eccentric block (561) attached thereto;
a cooker gear (511) attached to said stir-fry motor (512) and engaged with said eccentric gear (59);
a serving middle gear (615) pivotally mounted on said eccentric block (561);
an eccentric gear shaft (57) pivotally mounted on said eccentric block (561);
a gear (616A) pivotally mounted on said eccentric gear shaft (57) and having a first worm (616) extending therefrom, said gear (616A) engaged with said serving middle gear (615);
a serving shaft (614) received in said eccentric shaft (56) and having two ends each extending through said eccentric shaft (56); and
a serving shaft gear (614A) attached one end of said serving shaft (614) and engaged with said serving middle gear (615).

9. The automatic cooking machine as claimed in claim 1, wherein said cooker transmission device (5) includes:
a Π-shaped sheet (52A) having two sides each containing a groove (52A1) therein;
a U-shaped connecting arm (620A) having two sides each received in said groove (52A1) and two ends each having a rotating plate (528) pivotally mounted thereon;
a stir-fry cooker (51) mounted between said rotating plates (528);
a serving gear rack (620) attached to the bottom of said connecting arm (620A);
an n-shaped stir-fry rod (52) attached to said Π-shaped sheet (52A) and receiving said serving gear rack (620) therein; said n-shaped stir-fry rod (52) having one end forming a first lug (5211) and the other end forming a second lug (5212);
a seat (55) attached to said inner support (50);
a rocker linkage (53) having two ends, one pivotally attached to said seat (55) and the other pivotally attached to said first lug (5211) by an axle (54); and
a shaft mounted between said first lug (5211) and said second lug (5212), said shaft having a second worm (618) formed on one end and engaged with said serving gear rack (620) and a worm gear (617) formed on the other end.

10. The automatic cooking machine as claimed in claim 1, wherein said connecting arm (620A) includes:
a connecting plate (620B) attached to one side of said connecting arm (620A);
a push block (620C) extending from said connecting plate (620B);
a side rod (522) and a side push rod (524) pivotally attached to said Π-shaped sheet (52A);
a first stopper (525) extending from said side push rod (524) to abut said push block (620C);

a second return spring (523) having one end mounted on said side rod (522) and the other end mounted on said side push rod (524);

a linkage (527) including one end pivotally attached to a free end of said rotating plate (528) and the other end slidably and pivotally mounted on a free end of said side push rod (524); and a stop rod (526) attached to one side of said Π-shaped sheet (52A).

11. The automatic cooking machine as claimed in claim 1, wherein said stir-fry device (8) is attached to said frame (20) by a positioning plate (80) and includes:

a pivot plate (81) with two ears (82) each pivotally mounted on said positioning plate (80);

a spatula (83) pivotally attached to said pivot plate (81) and extending into said stir-fry cooker (51);

a push rod (84) pivotally attached to said ear (82) of said pivot plate (81);

a support plate (88) attached to said back plate (10);

a thumb plate (86) having a sleeve formed on one end and pivotally mounted on said support plate (88) by a pivot pin (87); and a connecting rod (85) has one end attached to said thumb plate (86) and the other end attached to said push rod (84).

12. The automatic cooking machine as claimed in claim 9, wherein said stir-fry device (8) is attached to said frame (20) by a positioning plate (80) and includes:

a pivot plate (81) with two ears (82) each pivotally mounted on said positioning plate (80);

a spatula (83) pivotally attached to said pivot plate (81) and extending into said stir-fry cooker (51);

a push rod (84) pivotally attached to said ear (82) of said pivot plate (81);

a support plate (88) attached to said back plate (10);

a thumb plate (86) having a sleeve formed on one end and pivotally mounted on said support plate (88) by a pivot pin (87); and a connecting rod (85) has one end attached to said thumb plate (86) and the other end attached to said push rod (84).

13. The automatic cooking machine as claimed in claim 1, wherein said serving device (6) includes:

a serving base (622) mounted on the bottom of said base (1);

a motor (67) attached to said serving base (622);

a link rod plate (63) pivotally mounted on said serving base (622) by a main shaft (64);

a link rod (42) and a serving link rod (62) respectively attached to the side of said link rod plate (63);

a serving tray (61) attached to the free end of said serving link rod (62);

a gas burner (41) attached to the free end of said link rod (42);

a main gear (65) attached to one end of said main shaft (64);

a main link rod (66) attached to the other end of said main shaft (64) and connecting to said washing device (7);

a third motor gear (68) attached to said motor (67), said main gear (65) engaged with said third motor gear (68);

a check pawl (651) and an inclined bar (652) with a second pull bar (653) attached to the bottom of said main gear (65);

a recess (63A) defined in the periphery of said link rod plate (63);

a balance rod (622A) pivotally attached to one side of said serving base (622);

a second stopper (622C) attached to said serving base (622);

a hook (622B) formed on the top portion of said balance rod (622A); and a first pull rod (62A) attached to the top portion of said serving link rod (62).

14. The automatic cooking machine as claimed in claim 1, wherein said washing device (7) includes:

a moving seat (79) slidably mounted on said base (1);

a connecting bar (711) with one end pivotally attached to said moving seat (79) and the other end pivotally attached to said main link rod (66);

a casing (712) and a washing motor (71) each mounted on said moving seat (79), said casing (712) containing a water outlet (78) defined in the bottom thereof;

a cleaner shaft (74) mounted on said moving seat (79) having spray holes defined therein and one end extending out of said automatic cooking machine;

an electromagnetic water valve (713) attached to the outer end of said cleaner shaft (74);

a cleaner gear (73) pivotally mounted around said cleaner shaft (74);

a fourth motor gear (72) attached to said washing motor (71) and engaged with said cleaner gear (73);

a cleaner wheel (75) mounted around said cleaner axle (74) and attached to said cleaner gear (73);

a centrifugal plate (77) attached to said cleaner wheel (75) and having a arcuate side corresponding to said stir-fry cooker (51); and multiple brushes (76) attached to said arcuate side of said centrifugal plate (77).

* * * * *